UNITED STATES PATENT OFFICE.

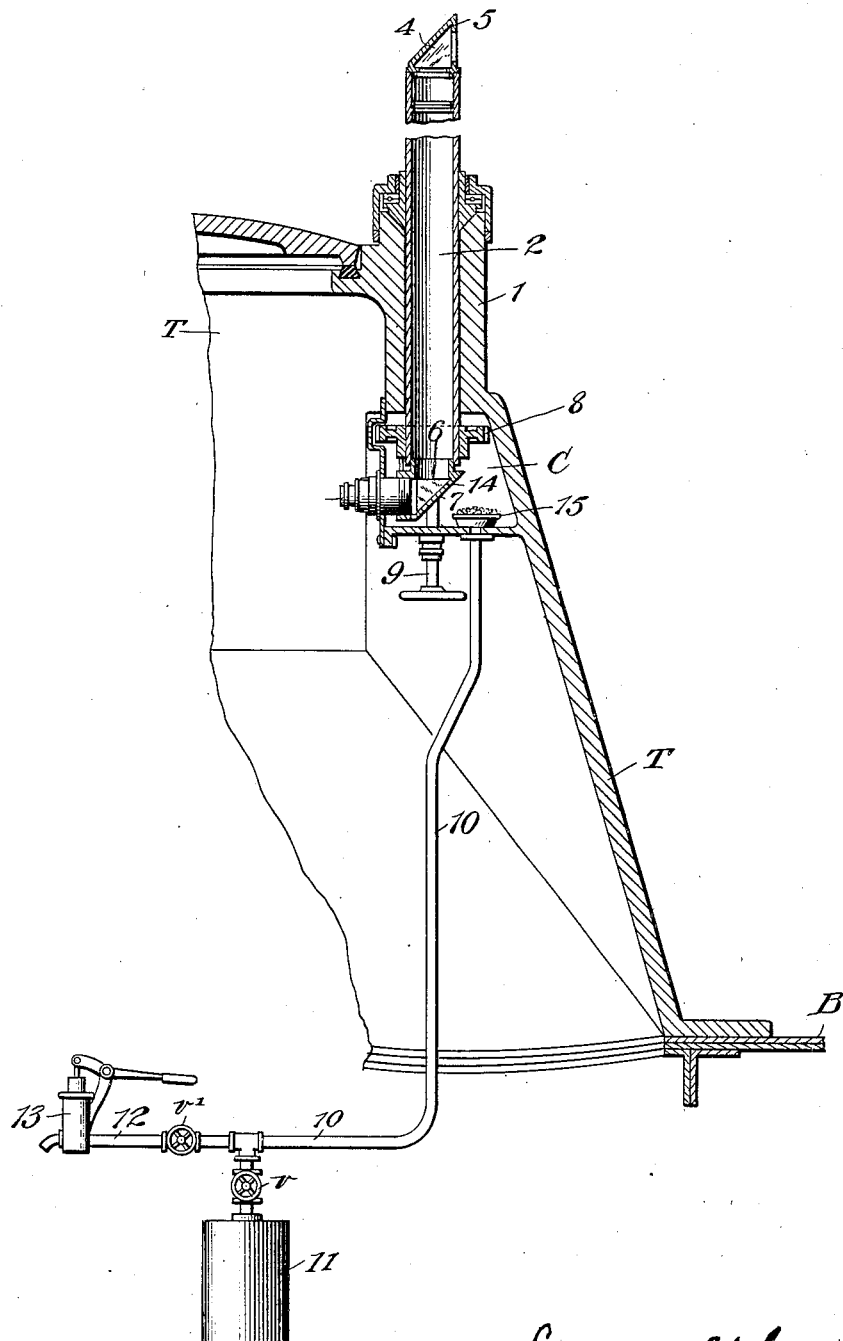

LAWRENCE Y. SPEAR, OF GREENPORT, NEW YORK, ASSIGNOR TO ELECTRIC BOAT COMPANY, OF GREENPORT, NEW YORK.

MEANS FOR PREVENTING CONDENSATION IN OPTICAL TUBES.

No. 832,219.      Specification of Letters Patent.      Patented Oct. 2, 1906.

Original application filed May 26, 1904, Serial No. 209,978. Divided and this application filed December 29, 1904. Serial No. 238,796.

*To all whom it may concern:*

Be it known that I, LAWRENCE Y. SPEAR, a citizen of the United States, residing in Greenport, in the county of Suffolk and State of New York, have invented certain new and useful Improvements in Means for Preventing Condensation in Optical Tubes, of which the following is a specification.

In the accompanying drawing, which illustrates an embodiment of the invention, the figure is a longitudinal axial section of a part of a submarine boat and an optical tube mounted in the conning-tower thereof, said tube being provided with means for preventing condensation constructed according to the present invention.

In the figure, B designates a part of a submarine boat, and T a part of the conning-tower, turret, or sighting-hood of the boat. At the side of the turret T is an upright socket or sheath 1 to receive an optical tube 2. This tube is fitted or supplied in any desirable manner with reflectors and, if desired, with lenses in order to receive an image at its upper end and deflect the same from its lower interior end into a substantially horizontal plane, where it may be observed through an eyepiece 3 from the interior of the conning-tower or turret. The tube may be fitted removably in its socket and be mounted so as to be rotatable about its vertical and longitudinal axis, and it may have suitable means for preventing access of water to the outer end of the socket and to enable it to rotate axially without undue friction. The means herein shown for effecting these ends are substantially the same as those shown in my United States Patent No. 751,569.

In the present construction the reflector at the upper end of the optical tube is a prism 4, inclosed in a box or casing 5, carried on the upper end of the tube. This prism turns with the tube, so as to face in any direction desired. The lower reflector is a prism 6, and it does not rotate with the tube, although it may do so as far as the present invention is concerned. This prism 6 is set or fitted in a fixed casting or hollow support 7, which has on its upper face a short cylindrical tube that fits accurately into the lower end of the optical tube. The eyepiece is secured to or screwed into this casting 7 and has a water-tight connection with the front plate of a chamber C, which incloses the lower prism 6 and adjacent parts. To be able to turn the optical tube, it has on it a gear-wheel 8, with which gears a pinion on the upper end of a shaft 9, which is rotatable in a stuffing-box in the bottom plate of the chamber C. These features, which serve to effect the rotation of the optical tube independently of the hollow support 7 and the eyepiece, are not essential to the present invention and are illustrated in a copending application, said application and the present case being divisions of my copending application, Serial No. 209,978, filed May 26, 1904.

The means for preventing condensation in the optical tube will now be described. The tight chamber C is connected by a pipe 10 with a holder 11 of dry air and by a pipe 12 with a pump 13. In the pipe 10 is a stop-valve $v$ and in the pipe 12 is a stop-valve $v'$. To prevent moisture in the air from condensing on and fogging the faces of the glasses or reflectors of the optical apparatus, the air may be first pumped from the chamber C and the optical tube by the pump 13. The valve $v'$ is then closed and the valve $v$ opened to admit artificially-dried air to the said chamber and tube. The air may flow freely between the optical tube and the chamber C through one or more apertures 14 in the hollow support 7. These apertures serve to connect the chamber C with the hollow in the support 7; and this hollow or chamber is open to that in the optical tube. To assist in preserving the air in a dry state in the chamber C, there may be set in it a receptacle 15 to contain a deliquescent salt. It may be stated here that the upper end of the optical tube is closed air-tight, so that when the air is removed from the instrument by the pump a nearly perfect vacuum will be formed therein into which the dried air rushes from the holder.

This invention is not concerned with any special means for drying the air, as it is not new to dry air and force it through the optical tube of an altiscope provided with a pressure-valve at its outer or upper end.

Having thus described my invention, I claim—

1. A submarine boat, having an optical instrument for receiving and deflecting an image down into the boat for observation at the eyepiece of the instrument, means connected with the instrument for exhausting the air from said instrument, and means for supplying to the latter artificially-dried air after the exhaustion has been made.

2. A submarine boat, having an optical instrument for receiving and deflecting an image down into the boat for observation at the eyepiece of the instrument, a pump 13 connected with said instrument for exhausting the air therefrom, a holder 11 for dry air connected with said instrument for supplying dry air in place of that removed by the pump, and valves respectively controlling the pump and holder connections with said instrument, whereby the dry air may be supplied to the instrument after the exhaustion has been made.

3. The combination with an optical instrument, of a source of dry air and a suction-pump, each connected with said instrument, and valves for respectively controlling the connections of said pump and source with said instrument, whereby the dry air is supplied to the instrument after the exhaustion has been made.

In witness whereof I have hereunto signed my name, this 24th day of December, 1904, in the presence of two subscribing witnesses.

LAWRENCE Y. SPEAR.

Witnesses:
BURGESS A. CREEDEN,
LEW C. MOORE.